United States Patent [19]

Becker

[11] Patent Number: 5,548,714
[45] Date of Patent: Aug. 20, 1996

[54] MEANS FOR STRUCTURING TECHNICAL INFORMATION IN ESTABLISHING A KNOWLEDGE BASE AND TROUBLESHOOTING IN TECHNICAL EQUIPMENT

[75] Inventor: Hans Becker, Sollentuna, Sweden

[73] Assignee: Televerket, Farsta, Sweden

[21] Appl. No.: 30,068

[22] PCT Filed: Sep. 18, 1991

[86] PCT No.: PCT/SE91/00625

§ 371 Date: Apr. 2, 1993

§ 102(e) Date: Apr. 2, 1993

[87] PCT Pub. No.: WO92/05503

PCT Pub. Date: Apr. 2, 1992

[30] Foreign Application Priority Data

Sep. 21, 1990 [SE] Sweden .................. 9003009

[51] Int. Cl.⁶ ............................ G06F 11/34
[52] U.S. Cl. .............. 395/183.02; 395/12; 395/911
[58] Field of Search ................. 395/575, 10, 12, 395/51, 52, 911, 912, 916, 183.01, 183.02

[56] References Cited

U.S. PATENT DOCUMENTS

| 4,954,964 | 9/1990 | Singh | 364/514 |
| 4,964,125 | 10/1990 | Kim | 364/513 |
| 5,107,497 | 4/1992 | Lirov et al. | 371/15.1 |
| 5,107,499 | 4/1992 | Lirov et al. | 395/911 |

FOREIGN PATENT DOCUMENTS

| 8802543 | 7/1988 | Sweden . |
| 2190772 | 11/1987 | United Kingdom . |
| WO90/00776 | 1/1990 | WIPO . |

OTHER PUBLICATIONS

Proceedings of the International Test Conference, The Computer Society of the IEEE, M. Ben–Bassat, et al., pp. 78–86, "A Proposed Benchmark Unit For Evaluating Electronic Troubleshooting Expert Systems".

Proc. Autotestcon' 89, M. Ben–Bassat, et al., pp. 1–5, "On The Evaluation Of Real Life Test Expert Systems".

Underhall & Driftsakerhet, Mar. 2, 1990, pp. 144 & 145, "Fault Finder: Expertsystem För Underhallssystem" [No English translation].

Proceedings of the fourth Conference on Artificial Intelligence applications, M. Ben–Bassat, et al, pp. 2–10, "AI–Test A Real Life Expert System For Electronic Troubleshooting (A Description And A Case Study)".

*Primary Examiner*—Robert W. Beausoliel, Jr.
*Assistant Examiner*—Trinh L. Tu
*Attorney, Agent, or Firm*—Oblon, Spivak, McClelland, Maier & Neustadt, P.C.

[57] ABSTRACT

A system and a method for structuring technical information in establishing a knowledge base and trouble shooting in technical equipment. An intelligent, electronical document is created in the quickiest and most efficient way for guidance training and troubleshooting of complex technical equipment. The required concepts are defined which are capable of describing states in a knowledge base, node types are defined indicating what type of information or instruction a node is to contain, views are read containing pictures or graphic descriptions of the equipment, nodes are inserted into the views to provide access points to various parts of the equipment, at least one of the nodes being a rule node containing at least one rule. The rule contains a condition part and a conclusion part, the condition part consisting of conditions on the equipment and the conclusion part containing measures to be taken if the conditions are fulfilled. The method and system are primarily used by developers and troubleshooters. The developers contribute with knowledge about technical equipment and with practical knowledge, such as rules of thumb. The troubleshooters can use the system without specific previous knowledge to perform troubleshooting, being systematically guided by the system to the source of failure.

1 Claim, 2 Drawing Sheets

MEANS FOR STRUCTURING TECHNICAL INFORMATION IN ESTABLISHING A KNOWLEDGE BASE AND TROUBLESHOOTING IN TECHNICAL EQUIPMENT

BACKGROUND OF THE INVENTION

1. Field of the Invention

The invention relates to a means and a method for structuring technical information and is a development environment designed to enable construction of an intelligent, electronic document in the quickest and most efficient way for guidance, teaching in a complex technical equipment. On a computer screen is shown what previously has been in manuals: block diagrams, circuit diagrams, photographs and instructions. An experienced technician uses the invention to find information about measurement results or sources of failures. A technician without computer experience can quickly learn to develop advanced systems. In troubleshooting, an unexperienced technician is guided by the invention through the technical equipment until the fault is located.

2. Description of the Background

Expert systems have been custom-designed for specific technical objects. In contrast, the present invention provides a general method of structuring a knowledge base and of helping users without specific previous knowledge.

SUMMARY OF THE INVENTION

Thus, the present invention provides a means and a method for structuring technical information in establishing a knowledge base for handling guidance, teaching and troubleshooting of technical equipment. According to the invention the required concepts are defined to describe states in the knowledge base. Node types are defined indicating what type of information/instruction a node is to contain. Views are read containing pictures or graphic descriptions of the equipment. Nodes are inserted in the views to provide access points of various parts of the equipment, at least one of the nodes being a so-called rule node containing at least one rule having a condition part and a conclusion part. The condition part consists of conditions of the equipment and the conclusion part contains measures to be taken if the conditions are fulfilled. The knowledge base is divided into blocks, if necessary, a base block containing information common to all the blocks and information about linking of the blocks.

When troubleshooting in a knowledge base in accordance with the invention, first the starting block is chosen, whereupon a starting view is shown. Then it is possible to choose a new block, a new starting view being shown, choose a new view within the block in question and/or to choose a new node in the view in question to proceed. A rule node is chosen to obtain instructions about what measures are to be taken, the instructions being followed until a conclusion is reached. If further information is desired a new text node or picture node is chosen.

BRIEF DESCRIPTION OF THE DRAWINGS

The invention will now be described in detail with reference to the accompanying drawings, in which.

DETAILED DESCRIPTION OF THE INVENTION

The invention provides an expert system structure for diagnosis, in other words a tool especially designed to build expert systems. Using the invention a person without any experience of programming or expert systems can build a diagnostic system. The system is useful for technicians performing troubleshooting in complex technical equipment. The diagnostic system collects knowledge from one or several experienced technicians. The knowledge is represented in rules guiding the troubleshooter to the source of the problem. The invention shows graphic circuit diagrams, block diagrams and photographs of the test equipment to provide the user with other relevant information.

The invention is in principle constructed like ordinary expert system structures. However, in contrast to these, considerable effort has been invested in making the user and expert interfaces user friendly. Besides these two interfaces there is a knowledge base with rules and facts. An inference machine draws conclusions based on the contents of the knowledge base.

Figure 1:
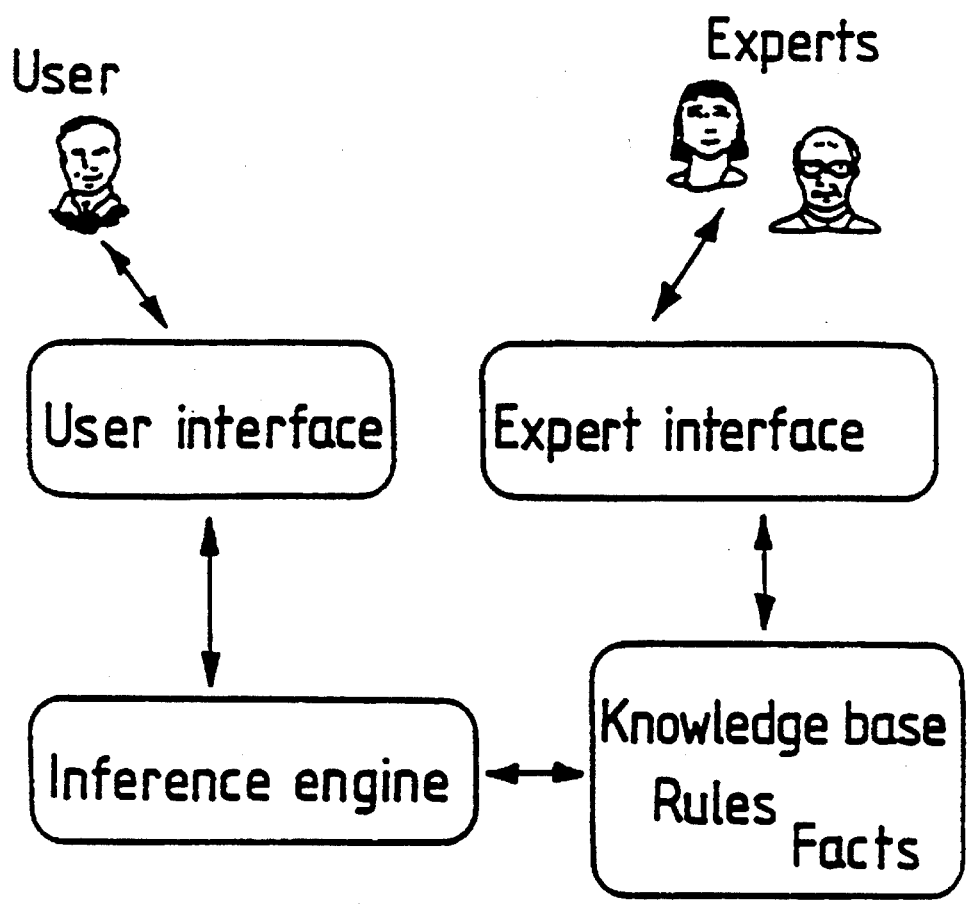
FIG. 1 shows the general structure of the invention with external and internal communication.

FIG. 1 shows schematically the structure of the system in accordance with the invention. There are two main groups using the invention, developers and troubleshooters. The developers enter diagnostic knowledge through the expert interface into the knowledge base. The troubleshooter has access to the knowledge base by means of the user interface and the inference machine.

Figure 2:
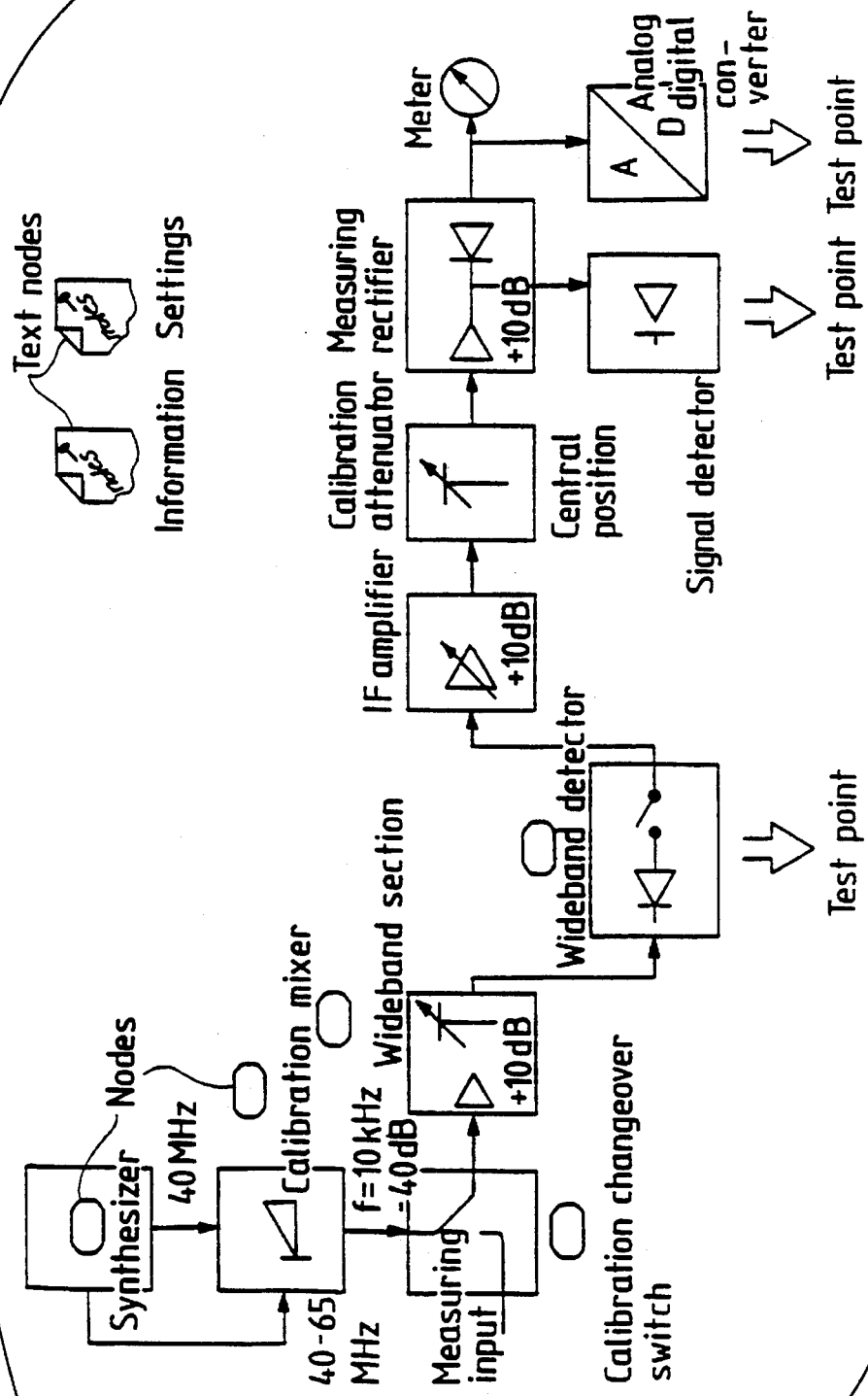
FIG. 2 shows an example of a view with nodes on a computer screen, and FIGS. 3A and B show symbols for picture nodes and text nodes, respectively.

The interfaces present views to the users to give access to the information. An example of such a view is shown in FIG. 2. A view is a description of the object being diagnosed. Typical views are photographs, block diagrams and circuits schematics. Attached to views are nodes which contain rules.

When troubleshooting, the service engineers navigate between test points before they arrive at the source of failure. The test points are often documented in service manuals. The manual states which value a test point should have when the equipment is functioning correctly. According to the invention, nodes are used instead of test points. A node can be a test point but also a physical object like a button or a fuse. Every node contains rules which lead the troubleshooter closer to the source of failure. The troubleshooter studies the view and selects a node suitable for inspection. When the node is selected further information or instructions are obtained, as is explained in detail below.

Figure 3:

Some nodes contain only information and may be of the types picture nodes or text nodes. In FIGS. 3A and 3B the symbols are shown for picture nodes and text nodes, respectively. These can be placed in views in the same way. When the user selects a picture node he gets a graphical display on the screen, and when he selects a text node a text window is displayed. The text window allows for editing text.

According to a preferred embodiment of the invention the information should be structured in the following way.

Concepts are objects defined globally in the knowledge base and are used to define attributes, see below. From one and the same concept several different attributes can be defined. Each concept has a name and a domaine and may have different settings, which is explained below. The concept may also be associated with a picture and a question.

The domaine contains elements of the same type. For instance, the concept voltage can be defined and given a domaine floating point number. The domaine of the concept then contains every floating point number and each floating point number is an element of the domaine. A domaine may be defined in three ways. It is possible to use a predefined domaine, define a closed interval or define a Set. Two domaines are predefined according to the invention, integers and floating point numbers. The intervals may be integer intervals or floating point number intervals. A set is a list of elements and is usually designated x, y, z, where x, y and z are the elements of the set. For instance, it is possible to define the concept pulse with the domaine long, short, correct. When a set is defined as a domaine of a concept one should state if the set is to be single or multiple. This is described below in connection with the section about attributes.

Unit, factor and tolerance are the settings of the concept. In case the domaine of a concept is an interval, an integer domaine or a floating point number domaine a tolerance may be associated with the concept. The tolerance can be relative or absolute. It is also possible to state a unit for the elements in the domaine of concept and it is also possible to state a factor. For instance, to the concept voltage the unit Volt and the factor 0.001 may be associated. If a user thereafter during a search gives the answer 2.3, the knowledge base will interpret this as 0.0023 Volts, i.e. 2.3 mVolt. In a rule node the voltage is for instance allowed to vary within an interval. To continue the investigation it is sufficient if the voltage is between 1.5 mVolt and 2.5 mVolt. Then there is a tolerance of 0.5 mVolt.

Attributes express states in the knowledge base by assigning to them values or sets of values. Each attribute has a domaine and only values included in this can be assigned to it. When an attribute is defined from a concept the attribute automatically gets the same domaine as the concept. When a value has been assigned to an attribute a fact has been added to the knowledge base.

Attributes exist in rule conditions, see below, and are of three types—local, global and internal. A local attribute is an attribute defined in a rule node. A global attribute is an attribute defined in the base block, see below, and, thus, not in any special node. Internal attributes are predefined and may assume values expressing certain states of nodes in the knowledge base. Examples of such states are if nodes are untouched or dead.

An attribute gets the same domaine as the concept from which the attribute is defined. If the domaine is a simple set the attribute defined from the concept can only assume one value at a time. If the set is multiple the attributes defined from the concept may assume several values. It is also possible to associate a tolerance, a unit and a factor with an attribute. If unit, factor and tolerance are indicated in the concept from which the attribute is defined these will be preselected in the attribute.

It is also possible to associate a relation with an attribute—a set relation. It is also possible to state a value or a set of values—set points. Set points and set relations are preselected in those conditions where the attribute is used, see below. Unit, factor, tolerance, set relation and set points are the settings of the attribute.

A relation expresses the relationship between two terms, right-hand and left-hand terms. Their values or sets of values have to be of the same type, for instance integers.

There are two kinds of terms—left-hand terms and right-hand terms. Left-hand terms are classified in three categories: global, local and internal attributes. Right-hand terms are classified in three categories: constants, local attributes and sets.

Example. In the rule IF voltage <2.5 Volts, THEN write the message "check C12", voltage is an attribute, 2.5 Volts is a constant and < is a relation. During an investigation a value is assigned to the attribute voltage, in this case being a left-hand term. The system will then investigate the relationship between this value and the value of the constant, i.e. investigate if the value assigned is less than 2.5 Volts. Here the right hand term is a constant.

Commands are calls to the system and are of three kinds—predefined, self-defined and external. A self-defined command is a sequence of external, predefined and self-defined commands. The sequence may not call itself. External commands are procedures compiled externally and inputted into the resource part of the base block.

Command sequences can be combined into methods. Methods occur in nodes and rules.

A rule contains a condition part and a conclusion part. The condition part consists of an arranged set of conditions. The conditions are created using terms and relations and may be true or false. The condition is fulfilled when it is true. Two methods belong to each rule. One of these methods is associated with the condition part and contains commands "Check conditions", which is a command to the system to investigate if the conditions of the rule can be fulfilled. The other method belongs to the conclusion part of the rule and is called if the conditions of the rule are fulfilled. The method always includes the command "Perform conclusion".

When navigating in a knowledge base a sequence of nodes is treated. When a node is treated the method of the node is called. There are several types of nodes: base nodes, rule nodes, text nodes, picture nodes and self-defined nodes. Base nodes do not contain any information but are used to mark a certain location on the screen picture. The rule node contains a number of rules. Text nodes and picture nodes contain text and picture information, respectively. Self-defined nodes are instances of node types created by oneself.

The node types are type descriptions of nodes and belong to the base block. When a node type is created it is possible to create one or more instances of this. An instance of a node type is a node given the content of the node type. If the content of the node type is changed each instance of it will automatically be changed.

The system has three predefined node types used to create common rule nodes, text nodes and picture nodes. It is also possible to create new node types to facilitate the development work. A rule node type created can for instance contain a number of attributes and commands.

If for instance the user is to indicate the voltage and current in a transistor in several rule nodes it is suitable first to define a node type—transistor voltage—with the attributes used. Thereafter the node type can be used to readily create instances of this. Then these instances are of the rule node type "Transistor voltage".

There are four categories of self-defined node types: rule node types, text node types, picture node types and base node types. The node types contain various methods. A picture node type for instance always contains the command "Show picture" causing the showing of the content of a picture node.

Each node type is represented by a symbol on a computer screen 1, see for instance FIG. 2. When a node type is created also a symbol has to be selected therefor. The symbol will then be in the Tool menu and it is then possible to create instances of the node type created in the same way as with predefined node types.

All information in a knowledge base is in blocks. A block is a document of its own containing views and nodes. The knowledge base can be divided into separate blocks, each block describing a defined part of the knowledge base. A knowledge base often consists of several blocks linked together. Each block has a starting view initially shown when a block is opened.

Each knowledge base has a base block. The base block is a special block containing information about how the blocks are linked together. In the base block is also information common to all blocks belonging to the base block. Such information is node types, concepts, commands, pictures and text. Each navigation in the knowledge base starts in the base block.

The system according to the invention is primarily intended for three types of users:

beginners: they can use the system as a conventional expert system, in other words, the system will ask the user about information as required;

experienced users: they can direct the system between a restricted number of nodes to state where the troubleshooting is to continue;

experts: the expert can move freely between the nodes. The system does not direct at all.

The user himself can decide which one of the above modes he wants to use.

As mentioned above there are two main user groups, developers and troubleshooters. Two categories of developers are intended, viz. manufacturers of test equipment and experienced service engineers. The manufacturers contribute with the profound knowledge about the test instruments. They introduce knowledge about which values are expected at test points, how failures should be discovered, which schematics should be presented etc. A manufacturer will work in a way similar to that when producing a manual, except now he makes an electronic information system including a frame work of rules for troubleshooting.

The service engineer complements the knowledge base developed by the manufacturer with the experience he obtains in his usual work. This knowledge is often called rules of thumb. The service engineer's practical knowledge often results in short cuts in finding faults. This contributes to a more efficient system.

The final user group of the system is the most important, the end users. It is they who really exploit the system for troubleshooting in technical equipment. They can not directly change the knowledge base.

The advantages of the invention are several in trouble shooting and developing diagnostic systems, for instance:

service engineers locate failures quicker, reducing the repair time, time-consuming search through manuals can be avoided while information is gathered at one place, personnel with little experience can troubleshoot independently, the system reduces the training period for new service engineers, it will be easier to distribute and hold knowledge about technical equipment, diagnostic systems can be complemented and modified directly in connection with new discoveries and experiences, it will be easier for manufacturers to get feedback about problems, the development of expert systems for troubleshooting becomes faster, diagnostic equipment gets a uniform appearance, people who are not trained programmers can develop diagnostic systems.

The invention is only limited by the claims below.

I claim:

1. A system for structuring technical and other information in a knowledge base in order to troubleshoot computer equipment and provide directions and training with technical equipment, comprising:

means for storing a knowledge base;

means for defining required concepts describing states in the knowledge base using definition functions, each definition function including node types indicating at least one of a type of information and an instruction that a node is to contain;

reading means for reading into the knowledge base views containing pictures or graphic descriptions of technical equipment;

input means for inputting plural nodes into the views to create points where at least one of additional information about various parts of the technical equipment and tests for various parts of the technical equipment are available, the input means inputting at least one node of said plural nodes as a rule node containing at least one rule having a condition part and a conclusion part, the condition part consisting of conditions for the technical equipment and the conclusion part containing measures to be taken if the conditions are fulfilled, and the means for storing the knowledge base comprising means to divide the knowledge base into a base block and other blocks, the base block containing information common to all the blocks and information about linking the blocks; and initiating means for choosing the base block as a current block arranged to display a starting view, the initiating means being arranged to select a new block, whereupon at least one of a new starting view is shown, a new view is selected within the current block, and a node is selected in a current view, the initiating means selecting at least one of a text node, a picture node and a rule node, wherein selected rule nodes obtain at least one of measurements and information from a user and wherein the selected rule nodes provide instructions about what measures are to be taken, further measurements and information being obtained and further instructions being provided by means of the initiating means until a conclusion can be drawn.

\* \* \* \* \*